United States Patent [19]

Hanlon, Jr.

[11] 3,720,393
[45] March 13, 1973

[54] ENERGY ABSORBER FOR ARRESTING MOVEMENT OF LOADS

[76] Inventor: John P. Hanlon, Jr., Scott Road, Concordville, Pa. 19331

[22] Filed: July 7, 1971

[21] Appl. No.: 160,350

[52] U.S. Cl. ............................................. 248/361 A
[51] Int. Cl. ................................................ B45j 1/22
[58] Field of Search ....248/361 A, 358 R, 20, 21, 25; 105/369 A; 280/179 A; 108/55

[56] References Cited

UNITED STATES PATENTS 2,687,270   8/1954   Robinson ............................ 248/20 X
3,465,691   9/1969   Simmons ....................... 105/369 A X

FOREIGN PATENTS OR APPLICATIONS 1,007,460  10/1965   Great Britain ..................... 105/369 A Primary Examiner—Edward C. Allen
Attorney—Smith, Michael, Bradford & Gardiner

[57] ABSTRACT

The device is designed to provide a hold down for cargo, seats, vehicle components, and the like subject to inertial forces due to sudden changes in velocity of the vehicle in which the cargo, etc., is being transported; parallel rails define a tie down attaching cargo, seat, vehicle body or the like, to the basic structure; the rails being secured in relative positions by shear pins or rail anchors permitting relative movement within specified limits. Upon a sudden velocity change of the carrier, for example in a crash, the inertia of the load creates a force vector which moves one rail with respect to the other, when this occurs the movement of the rails is arrested by a deformable energy absorbing cup and pin structure to a predetermined limit after.

8 Claims, 10 Drawing Figures

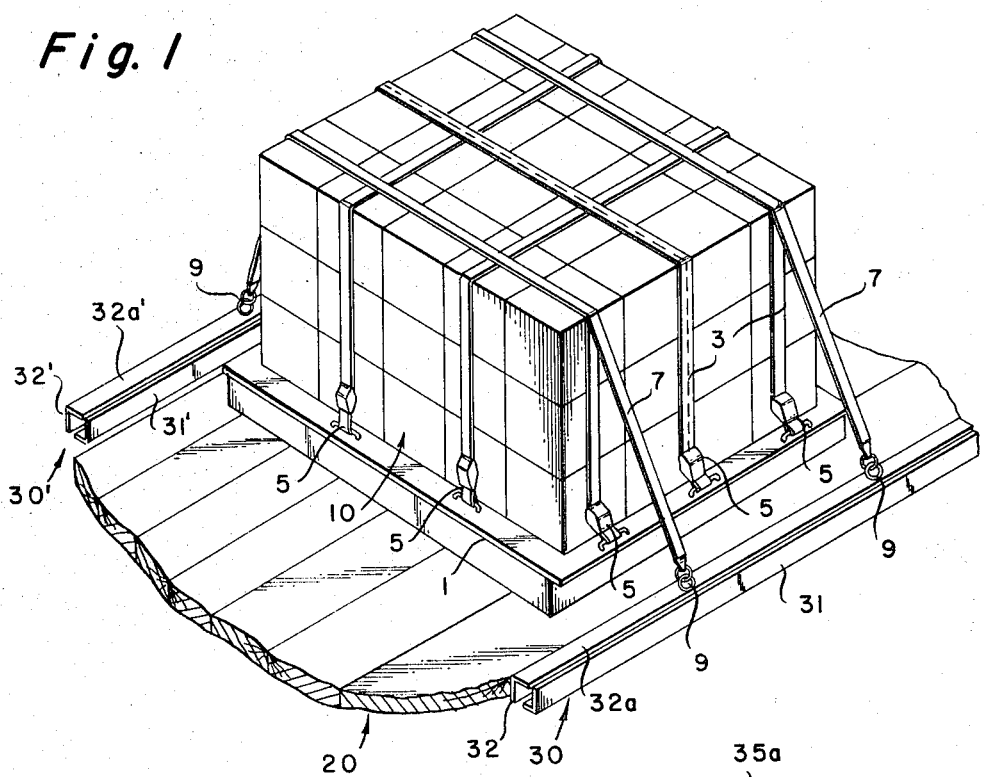
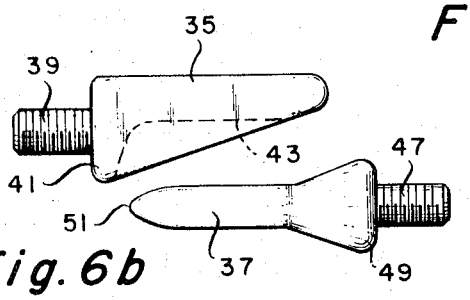
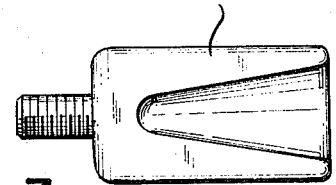
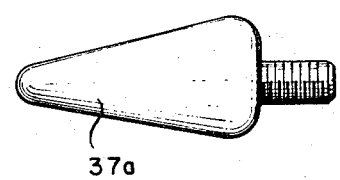
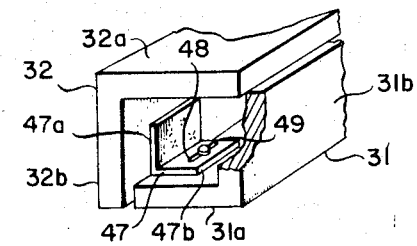

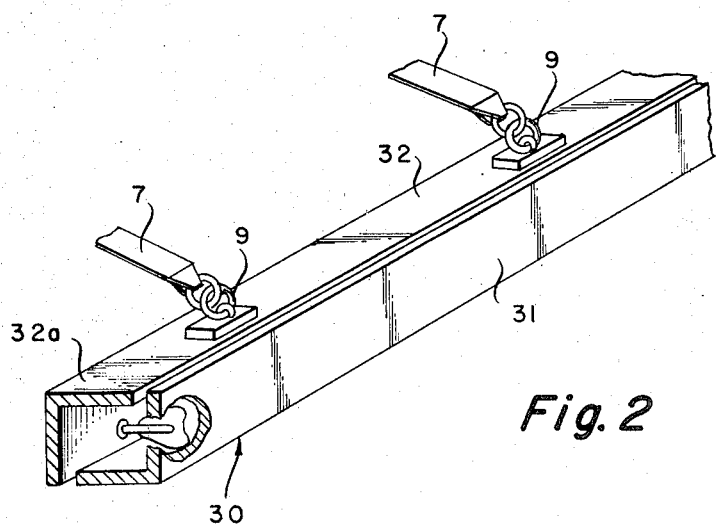
Fig. 2
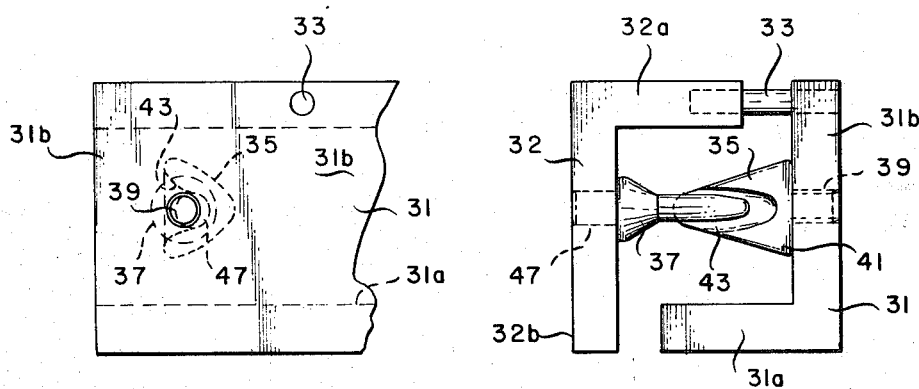
Fig. 4
Fig. 3
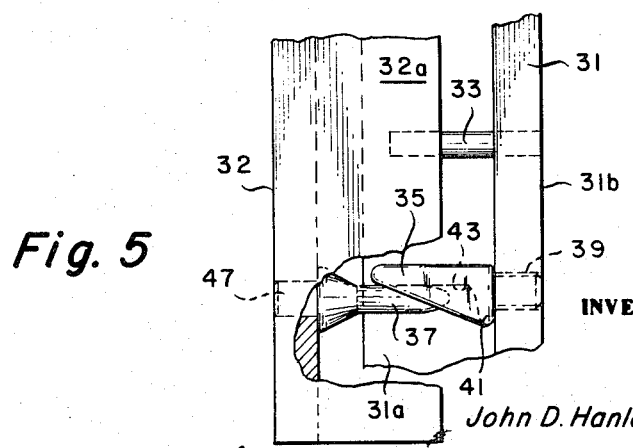
Fig. 5
INVENTOR
John D. Hanlon, Jr.
BY Smith, Michael Bradford
and Gardiner
ATTORNEYS

ENERGY ABSORBER FOR ARRESTING MOVEMENT OF LOADS

BACKGROUND

One problem which continually confronts the transportation industry is that of shifting loads caused by rapid and unexpected changes in cargo-carrier direction or velocity, particularly where the latter is an unusually rapid or drastic reduction in velocity occasioned by an accident. Under such circumstances, any objects being transported on or in the carrier become lethal weapons due to the well recognized inertia effect as these objects tend to continue their motion unless so well secured to the carrier that relative motion of the object with respect to the vehicle is absolutely impossible.

As examples of the problem with which this invention deals may be found in various situations at least two of which are quite notable, the crash of an aircraft, in particular a cargo aircraft and/or an accident involving a truck for example, a flat bed tractor trailer carrying steel sheets or rods. In either case the carrier is subject to tremendous deceleration. The objects being transported are, of course, traveling at the same velocity as the carrier at the time of impact and tend to maintain this velocity as the carrier is decelerated. Thus, if not restrained, the objects simply continue in the original direction and at the original velocity until they in turn contact an object or objects as immobile as the earth or other surroundings responsible for deceleration of the carrier or some portion of the carrier or its contents capable of restraining and reducing the velocity of the carrier objects to zero. Not only are the cargo objects, therefore, subject to violent damage on impact but anything in their path is also subject to damage until their velocity is reduced to zero. Having in mind that most carriers are front operated, that is the operator's station is located ahead of the cargo area, it becomes apparent that, in the event of a crash or accident involving violently rapid deceleration of the carrier, the operator or operators are subject to as much danger from serious injury from the unleashed cargo approaching from the rear as they are from impact with the ground or other immobile object which the carrier itself encounters in the initial impact.

For the reasons stated, it is customary to fix the cargo to the carrier so as to, as much as possible, render the cargo absolutely immobile on and with respect to the carrier. The cargo is then subject to velocity and acceleration or deceleration changes along with and at the same rate and direction as the carrier. Of course, the inertial forces vary according to mass differential between carrier and load, i.e., a 5,000 pound load on a 4,000 pound vehicle. The most widely used method of effecting connection of cargo to carrier involves the use of tie-down cables, straps or ropes which pass over the cargo and have their ends attached to the vehicle at some given point. Thus, the carrier itself must be designed to include anchors capable of absorbing the stress of forces induced in the tie-downs as the cargo attempts relative movement with respect to the carrier when the carrier is subject to changes of direction and velocity. Also, the tie-down medium must be able to withstand tensile stress to effect the same result.

For many reasons, too numerous to mention, but at least two of which are economic factors and weight and space factors, it is a practical impossibility to design the carrier with anchors sufficiently strong to render the cargo completely immobile relative to the carrier under the most violent deceleration conditions anticipated for the carrier. In other cases, as for example sheet steel being carried on a truck, it is physically impossible to render the cargo completely immobile regardless of the strength of the anchors or carrier. The reason is that, while overload tie-downs can exert great pressure on the top sheets and between the floor of the vehicle and the bottom sheets it is, in the last analysis only friction between the intermediate sheets which holds them immobile. Thus, if the stack is subject to deceleration forces sufficient to overcome the frictional engagement of the intermediate sheets with one another, the sheets will spew out in the original direction and at the original velocity of the carrier before deceleration velocity with disastrous results to anything or any one in their path.

The recognition of the problem being dealt with here manifests itself in prior issued patents all directed to the same subject and disclosing various approaches attempted to overcome the problem. For example, Quick U.S. Pat. No. 3,131,903 discloses a system for accomplishing the desired result. In this patent a mounting system is disclosed and combines the use of shear pins and resilient mounting for the object.

Jackson et al., in U.S. Pat. No. 3,377,044 discloses another approach utilizing a metal binder energy absorber to accomplish the desired result.

Drophin in U.S. Pat. No. 2,837,176 utilizes a bumper and progressive shearing pins to absorb energy from an object under the influence of inertia forces creating relative movement between the object and its carrier.

As far as known, none of these devices have come into general usage or have met with extensive success, for one reason or the other, with the result that the problem remains prevalent in the cargo transportation industry.

Also, too little has been done in respect of personnel carriers to alleviate the injury to passengers. In vehicles such as buses, school buses in particular, aircraft, railroad cars, people as well as the seats become inertia affected objects like cargo capable of injury and inflicting injury when the seats or seat belts tear loose from moorings.

THE INVENTION

The instant device relates to an energy absorber system and structure which is intended to overcome all the objections to known prior devices and which is capable of use in all types of vehicles regardless of the cargo, living or otherwise, being transported.

An object of the invention then, is to provide a simple yet effective energy absorber system and structure for cargo carriers.

Still another object of the invention is to provide a simply installed energy absorber device of general utility.

An additional object is to provide an inertia absorber safety device adapted for cargo carriers to protect adjacent objects and/or personnel from damage or injury in the event of an accident.

The specified objects and others, which will be apparent to those skilled in the art, are accomplished by the device which will be described hereinafter in detail with reference being made to the drawings, wherein:

FIG. 1 is a general view of a palletized cargo showing the typical tie-down arrangement and the invention as applied thereto;

FIG. 2 is an enlarged view of the invention with certain parts broken away,

FIG. 3 is a partial end elevational view of the left-hand end of the device shown in FIG. 2, FIG. 4 is an end view of the device shown in FIG. 3, while FIG. 5 is a top view, with portions broken away, of the device illustrated in FIG. 4, FIGS. 6a and 6b are illustrations of one form of a cup and pin absorber, while finally, FIG. 7a and FIG. 7b are illustrations of a modified form of cup and pin absorber.

FIG. 8 is an illustration of a further form of the invention.

Considering first, FIG. 1, there is shown a typical and most conventional arrangement for transporting cargo. The cargo 10 is stacked and supported on a conventional load-carrying pallet 1. As is also conventional, the cargo 10 is affixed in position on the pallet 1 by means of nylon or the like straps, 3, which are, in turn, affixed at their ends to strap anchors 5 anchored on pallet 1. Pallet 1, in turn, is shown resting on the flat floor 20 of a cargo-carrying vehicle, which vehicle has incorporated in the floor area, the structure comprising inertia absorbers.

As is obvious, the cargo 10 and pallet 1, if unsecured in any other fashion than has been described thus far, is capable of movement relative to floor or vehicle 20 when, and if, subject to vertical and/or horizontal forces in excess of its total weight or greater than the friction developed between the bottom of pallet 1 and the top of floor surface 20. In order to assure that the pallet remains immobile on the floor 10, the usual practice is to further anchor same by means of cables or straps 7 which are attached, at their respective ends to suitable floor anchors 9. In the usual arrangement, floor anchors 9 are eye bolts, or the like, permanently attached to either floor 20 or to some structurally sound portion of the vehicle undercarriage provided for that purpose.

In this case, however, anchors 9 are attached to a pair of energy absorber devices 30, 30', to be described in detail, and which have been incorporated into the vehicle structure flush with floor area 20. As shown in FIGS. 2 et seq., the energy absorbers are comprised of a pair of parallel rail members, 31 and 32. As shown in the preferred form, the rails are L-shaped, one L-shaped rail being inverted with respect to the other, so that in cross-section they define a generally hollow elongated box. While rail sections of other cross-sectional configuration could be used, the described configuration is preferable because the one surface 32a of rail 32 provides a surface which is easily arranged flush with the cargo bearing surface 20. At the same time, the surface 31a of rail 31 provides an easily affixed means of anchoring rail 31 to the understructure of the carrier, or to the frame of a vehicle as for example, when the body components of the vehicle would be attached to the frame of the vehicle with the energy absorber interposed therebetween.

As shown more clearly in FIGS. 4 and 5, the rail members 31 and 32 are rigidly interconnected by an end-threaded stud member 33. D-pending on design factors such as anticipated load derived from estimates of maximum cargo weight and maximum impact deceleration anticipated, a number of such studs will be spaced at regular intervals along rails 31, 32 and threadedly engaged with the vertical leg 31b of rail 31 and the horizontal leg 32a of rail 32. At a minimum two studs 33 will be required, one adjacent the respective ends of rails 31, 32 to keep same in proper parallelism.

In addition to fixing rails 31, 32 in proper relation with respect to each other, the studs 33 may define shear pins specifically fabricated to break under a given lateral or shear force. Again, the design parameters are contingent on the expected maximum inertia loads which might be transmitted to rail 32 as well as the number of energy absorber devices installed between rails 31 and 32 as will be exemplified hereinafter.

The vertical legs 31b and 32b are also provided with additional members which interact between them. Again as shown in FIGS. 4 and 5, in some detail, these members comprise what may be broadly categorized as cup and pin elements 35 and 37. One of these elements, in this case cup element 35, is threadedly or otherwise engaged with the vertical leg 31b of rail 31 while the other element, in this case pin 37, is threadedly or otherwise engaged with the vertical leg 32b of rail 32. It will be appreciated that the position of these elements could be reversed although their relationship with respect to each other must be maintained as will now be described.

In the arrangement shown in FIGS. 3, 4 and 5, the cup 35 and pin 37 are of the form or species shown further in FIG. 6. The cup 35 is a generally right triangular block having a threaded portion 39 affixed to the base. The adjoining angular wall 41 is provided with a shallow recess 43 which is so dimensioned as to receive pin 37 therein. The cup 35 is affixed to the rail 31 such that the recess opens rearwardly or in the direction opposite to that which the maximum forces are anticipated.

Pin 37 also includes a threaded portion 47 integrally attached to an enlarged base 49. The remainder of the pin may be somewhat conical in form from base 49 to a smoothly rounded tip 51 and is configured to fit snugly within the complimentary configured recess 43 provided in cup 35.

Briefly digressing to FIG. 7, it may be seen that cup 35a may be formed as a cylinder properly contoured to receive pin 37a internally. It should be understood that other configurations of cup 35 and pin 37 are also possible but, that, in the preferred configuration it is desireable to form the cup and pin with a minimum of short edges or radii to avoid the usual condition of localized stress at such areas or junctures.

Returning to FIGS. 3, 4 and 5, it will be seen that the cup and pin 35 and 37 are so located on rails 31 and 32 that they are just in contact. Thus, they do not cooperate in any manner to fix the position of these rails, with respect to one another, this function being accomplished by shear pins 33 previously described.

An alternative arrangement for securing rails 31 and 32 in aligned relation is shown further in FIG. 8. In this combination, shear pins 33 are replaced by angle or L- shaped brackets 47, one leg 47a of which is welded to leg 32b of rail 32. The other leg 47b of L-shaped bracket 47 is fixed to the leg 31a of rail 31 by means of a bolt and slot connection wherein slot 48 extends parallel to the length of rails 31 and 32 and wherein bolt 49 is threadedly engaged with rail 31 so that it passes through slot 48 with its head serving to anchor the bracket 47 to rail 31.

Before describing the operation of the device, it should be noted that the inertia absorber as installed is comprised of two absorbtion assemblies 30, 30' as illustrated in FIG. 1. Since these devices are identical, only the right side device 30 has been described in detail, it being believed obvious that illustration of device 30' would simply be a duplication of the foregoing descriptive matter with all reference numerals being simply prime numerals of those used in FIGS. 3, 4 and 5 in particular. Thus, device 30' is not described in detail to avoid duplication.

OPERATION

Referring back to FIG. 1 it will be again noted that the cargo 10 is held stationary on the floor area of the carrier vehicle by means of the usual strap, cable or rope tie-downs 7 and anchors 9. Anchors 9 are eye bolts or ring bolts, see FIG. 2, which are immobile and firmly affixed to the inertia absorber devices 30, specifically rails 32a, 32a' comprising the horizontal legs of the duplicate rail members 32, 32'. Rails 31, 31' are rigidly affixed to the substructure of the carrier and connected to rails 32, 32' by shear pins 33 or by rail anchors 47 as described in connection with FIG. 8.

It is believed apparent that the effectiveness of the device for its intended purpose is dependent on a considerable number of variables including the manner in which the rails are anchored, the anticipated load factor; the maximum rate of anticipated deceleration, which latter factor is tied to the anticipated velocity of the carrier; the number of cup and pin assemblies. However, it is a fundamental necessity that the rails 31 of each assembly 30 are affixed to the vehicle structure such as to be immobile with respect thereto. Similarly, rails 32 must be affixed to the immobile rails 31 such as to remain fixed relative thereto for all normal anticipated conditions of acceleration or deceleration that are anticipated for the vehicle or carrier regardless of what form the latter may take. Thus, for example, if the vehicle or a carrier were an aircraft, the calculations would be based on maximum aircraft speed, maximum load factor and maximum "G" loads, both positive and negative vertical loads, and the maximum deceleration or acceleration rates anticipated during take-off or landing. With these factors established, then, it is a conventional stress calculation to determine what loads the rail anchors 47 and associated bolts 48 or shear pins 33, depending on which is used, must be capable of withstanding in shear before any movement occurs between rails 31 and 32.

Similarly, calculations can be derived for the size, number, etc., of pins 37, 37a and cups 35, 35a which must be used to provide for energy absorption under "crash" or emergency conditions. Such calculations are based on the formulation:

$$F = c'' \, SL^2/Ec$$

where $c''$ factor (Marks Handbook — Cantilever beam load concentrated at one end)

$S$ = stress (of pin)
$L$ = length
$E$ = Modulous of Elasticity
$c$ — Pin Radius In a typical situation let us assume that the anticipated load to be restrained by an absorber system is 6,130 pounds. Also, for reasons of economy, space, etc., the pin size is to be ½ inch O.D., 4 inches long and overlaps the cup by 1 inch. The material of the pin is 4,130 steel.

Based on the above formula we find that such a pin will deflect 0.062 inch, before it becomes permanently deformed. Since the force required to achieve this deflection is determined by the formulas:

$$m = S \times .1 d^3$$

$$\text{and } P = m/3$$

where $P$ = *pounds load*

$m$ = pounds to attain 0.062 inch deflection $s$ = stress $d$ = diameter we find that each pin will sustain 613 pounds. If then the load is 6,130 pounds it becomes readily apparent that 10 pin and cup assemblies will be necessary for a shock absorber system to function at the given conditions. Thus, in a two-device system shown each of the rails 31 would be connected to the rails 32 by five cup and pin assemblies 35, 37 or 35a, 37a, as the case may be.

With the example given, should the carrier encounter a condition of extremely rapid deceleration as for example, the violent rate of deceleration created by a crash or other accident, the forces on the load will tend to carry the load in the same direction and velocity as the load was moving immediately before the condition of rapid deceleration, with the total force being 6,130 pounds. The load tends to move relative to the carrier which is decelerating rapidly. Since the shear pins or rail anchors are designed to shear at a predetermined load at least the initial resistance to inertia forces acting on cargo 10 will be carried by these pins until their shear point is reached. At this point the rails 32, 32' would be free to move forward. However, at this point the contact between cup 35 and pin 37 has been established with ever increasing effectiveness so that the energy or inertial forces are being absorbed by the deflection of pins 37. Thus, the entire load or inertial energy is absorbed by deformation of the pins 37, within their elastic limits, until such time as the deceleration of cargo relative to the decelerated or stopped carrier is reduced to virtually zero such that the cargo does not become an article of destruction but is maintained generally in its position on the carrier.

While the operation of the device has been described as if the process is carried out over a considerable period of time, it must be realized that in most emergency conditions, less than a second lapses between the time the deceleration begins and the inertia load on the cargo exceeds the design loads at which the cargo is relatively secure on the carrier. Thus, if the inertia absorbtion functions for but a brief few seconds, as it does, after the unusual conditions are created, sufficient inertia energy is absorbed to preclude the cargo from shifting radically relative to the carrier.

Having described the invention, it is believed apparent that changes may be made therein within the spirit and scope of the claims wherein:

What is claimed is:

1. In a cargo carrier, a plurality of energy absorbers disposed in the cargo carrying area, each of said devices comprising a pair of spaced parallel rail members, at least two anchor members interconnecting said rail members and maintaining same in position with respect to one another until the shear loads acting to move said rail members relatively, axially, exceed the designed load for said anchors, a further energy absorber means disposed between said rails and functioning to limit relative movement of one of said rails with respect to the other by elastic deformation when the load exceeds the design load or said anchor members, said further energy absorber means comprising a pin affixed to one rail and an abutment fixed to the other rail said abutment engaging said pin on one side thereof to prevent relative movement of said pin in the direction of anticipated inertial force.

2. The combination defined in claim 1 wherein said abutment is in the form of a cup receiving said pin.

3. The combination as defined in claim 1 wherein said rail members are L-shaped and wherein one said rail member is inserted with respect to the other to define therewith a generally elongated box within which said further energy absorbers are housed.

4. The combination defined in claim 3 wherein one L-shaped rail is immobilely anchored to the carrier substructure and said inverted L-shaped rail is disposed with one surface parallel to the floor of the cargo carrying area of said carrier.

5. The combination as defined in claim 4 wherein said inverted L-shaped rail is provided with anchor means for receiving the end of a cargo tie-down means.

6. The combination defined in claim 1 wherein said abutment is in the form of a right-triangular block having a shallow recess in one face adapted to receive said pin.

7. An energy absorber system comprising a pair of parallel spaced structural members, anchor means for maintaining said structural members in aligned, parallel relation until a given shearing stress acts thereon, at least one energy absorber means disposed between said elongated members, said means including a resiliently deformable pin on one of said structural members contacting a receptacle on the other of said structural members said pin and said receptacle being in face-to-face but unrestrained contact with one another when the integrity of said anchor means is maintained.

8. An energy absorber as defined in claim 7 wherein said structural members comprises L-shaped rails disposed to define an elongated box and said anchor means and energy absorber means is enclosed within said box.

* * * * *